United States Patent [19]
Kim

[11] Patent Number: 5,886,426
[45] Date of Patent: Mar. 23, 1999

[54] POWER SWITCH LOCKING DEVICE

[75] Inventor: Kwan-Wook Kim, Suwon, Rep. of Korea

[73] Assignee: SamSung Electronics Co., Ltd., Kyungki-do, Rep. of Korea

[21] Appl. No.: 937,455

[22] Filed: Sep. 25, 1997

[30] Foreign Application Priority Data

Sep. 25, 1996 [KR] Rep. of Korea .................. 1996 42702

[51] Int. Cl.$^6$ .................................................. H01H 71/10
[52] U.S. Cl. .................... 307/142; 200/43.01; 200/50.01
[58] Field of Search ................................... 307/142, 139; 20/43.01, 50.01, 50.09

[56] References Cited

U.S. PATENT DOCUMENTS

| | | | |
|---|---|---|---|
| 4,002,956 | 1/1977 | Minor et al. | 361/194 |
| 4,068,276 | 1/1978 | Pintell | 361/46 |
| 4,095,067 | 6/1978 | LaScola | 200/455 |
| 4,314,307 | 2/1982 | Sivahop et al. | 361/194 |
| 4,362,954 | 12/1982 | Cotton | 307/142 |
| 4,559,456 | 12/1985 | Yamamoto et al. | 307/66 |
| 4,642,753 | 2/1987 | Easthill | 364/184 |
| 4,689,492 | 8/1987 | Peteuil | 307/142 |
| 5,070,219 | 12/1991 | Grosskrueger et al. | 200/43.01 |
| 5,193,665 | 3/1993 | Jankow | 200/43.08 |
| 5,196,731 | 3/1993 | Abe et al. | 307/142 |
| 5,293,011 | 3/1994 | Mokert | 200/43.14 |
| 5,338,218 | 8/1994 | Haas | 200/43.01 |
| 5,432,387 | 7/1995 | Kogure et al. | 307/138 |
| 5,434,368 | 7/1995 | Hoffmann | 200/43.22 |
| 5,734,206 | 3/1998 | Keizer et al. | 307/142 |

*Primary Examiner*—Albert W. Paladini
*Attorney, Agent, or Firm*—Robert E. Bushnell, Esq

[57] ABSTRACT

A power switch locking device for controlling the on/off function of a soft touch type power switch is disclosed. In general, the output of the power switch is provided to an input of a microcontroller that switches on/off the main power switch or relay of the microcontroller in response to the signal level provided by the power switch. The power switch locking device of the invention cooperates with a function switch or key specified in the electrical appliance to control the on/off function of the power switch. Also, the function switch is of the soft touch type producing a momentary switch-on output signal when the switch is pressed. A switching control circuit is provided for receiving the output signals from the power switch and function switch, and for producing a control output signal capable of inverting its logical level state whenever the same level output signals from the power switch and function switch are inputted. Further included is an analog switch responsive to the control output signal level of the switching control circuit to connect the signal output of the power switch to, or disconnect it from, the power switch signal input of the microcontroller. In addition, a switch signal source is provided on the output side of the analog switch for generating a power switch signal that corresponds to the off state when the analog switch is in the disconnect or cut off state. Thus, the power switch is placed into a locked state when the power switch and the function switch are pressed simultaneously. During the locked state, the function of the power switch is disabled. Further, the power switch returns to the normal state when the power switch and the function switch are pressed again simultaneously. Thus, locking/unlocking the on/off function of the power switch is possible by pressing the power switch and one of the specified function switches.

17 Claims, 3 Drawing Sheets

POWER SWITCH LOCKING DEVICE

CLAIM OF PRIORITY

This application makes reference to, incorporates the same herein, and claims all benefits accruing under 35 U.S.C. §119 from an application for A POWER SWITCH LOCKING DEVICE earlier filed in the Korean Industrial Property Office on the 25$^{th}$ of Sep. 1996 and there duly assigned Ser. No. 42702/1996.

BACKGROUND OF THE INVENTION

1. Technical Field

The present invention relates to a power switch for electrical appliances, and more particularly to an on/off control circuit for a soft touch type power switch having momentary contact points.

2. Related Art

Presently, most power switches for switching on/off power supplies used in electrical appliances adopt some push button type switch for easy operation and refined sensibilities. In particular, push button type power switches operated in a soft touch manner are effective in use with home appliances, for example, televisions, VCRs, remote controls, portable computers, etc., since they are in harmony with other function switches or alphanumeric keys using soft touch type push button switches.

In conventional power switches, there is a normal state in which the power switches are not pressed, and the signal supplied to the appliance connected to the power switch is maintained at a predetermined positive voltage. This maintains the appliance in the power-off state. On the other hand, if the power switch is pressed by the user of the appliance, the supply line is altered so that power is applied to the appliance. Once such a power switch of the prior art is pressed again, the appliance is toggled to the power-off state.

A problem with this prior art power switch resides in the fact that the appliance is toggled to a power on or off state whenever the switch is pressed. Thus, erroneous or mischievous pressing of the power switch will result in undesirable change of state of the appliance, with possible disruption to the functioning of the appliance or even possible damage thereto.

The following patents are considered to be representative of the prior art relative to power switches, and disclose arrangements and techniques which are burdened by the disadvantages discussed above: U.S. Pat. No. 5,432,387 to Kogure et al., entitled Power Source Voltage Supply Controlling apparatus, U.S. Pat. No. 5,293,011 to Mokert, entitled Power Lockout Device, U.S. Pat. No. 5,196,731 to Abe et al., entitled Power On/Off Circuit With Lock Function, U.S. Pat. No. 4,689,492 to Peteuil, entitled Switching Circuit, U.S. Pat. No. 4,642,753 to Easthill, entitled Domestic Electrical Appliance, U.S. Pat. No. 4,559,456 to Yamamoto et al., entitled Battery Powered Electric Appliance, U.S. Pat. No. 4,362,954 to Cotton, entitled Power-Up Control For Microprocessor Based Appliance, U.S. Pat. No. 4,314,307 to Sivahop et al., entitled Electro Mechanical Sensor Power Up Circuit, U.S. Pat. No. 4,095,067 to LaScola, entitled Appliance Switch, U.S. Pat. No. 4,068,276 to Pintell, entitled Protective System For Electrical Appliances, and U.S. Pat. No. 4,002,956 to Minor et al., entitled Automatic Electronic Lock Off System For An Appliance.

SUMMARY OF THE INVENTION

The present invention is intended to overcome the problems of the prior art. It is therefore an object of the invention to provide a power switch locking device which can control on/off operation of a soft touch type power switch used in an electrical appliances.

It is another object of the present invention to provide a child resistant feature in an electrical appliance that has a soft touch type power switch.

In accordance with principle of the present invention, the above objects are achieved by a power switch locking device for controlling the on/off function of a power switch for an electrical appliance having a soft touch type power switch and a plurality of function switches of the same type. The power switch locking device has control means responsive to a combinational key input of the power switch and one of the function switches to convert to a locked state that limits the on/off function of the power switch, and responsive to the combinational key input of the power switch and one of the function switches to release the locked state. In the locked state the power switch is disabled from functioning as a power switch, and in the released state the power switch resumes its on/off function.

In the preferred embodiment described below, the power switch locking device comprises: a soft touch type power switch in which the output of the power switch is provided to a micro-controller having a main power switch which switches on/off; a function switch specified in an electrical appliance to produce a momentary switch-on output signal when the function switch is pressed; switching control means for receiving the output signals from the power switch and function switch, and for producing a control output signal capable of inverting its logical level state whenever the same level output signals from the power switch and function switch are inputted; an analog switch responsive to the control output signal level of the switching control means to connect/disconnect the power switch signal supply line between the signal output of the power switch and the power switch signal input of the micro-controller; and a switch signal source provided at the rear end of the analog switch for generating the power switch signal that corresponds to the off state when the analog switch is in a cut-off state.

Further, the switching control means consists of a NOR gate and a J-K flip-flop, in which the signal outputs of the function switch and power switch are connected to the inputs of the NOR gate, and the output thereof is the clock input of the J-K flip-flop, and wherein the inputs to the J-K flip-flop are commonly connected to the supply voltage to be set to the logic high level state.

According to the power switch locking device of this invention, locking/unlocking of the on/off function of the soft touch type power switch is possible by pressing the power switch and one of the specified function switches. Therefore, the power switch locking device as provided in the subject invention provides a security function for preventing erroneous pressing of the power switch and for preventing the unauthorized person from operating the power switch. Also, the power switch locking device according to the present invention provides a child resistant feature that prevents mischievous operation of the soft touch type power switch in the electrical device.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
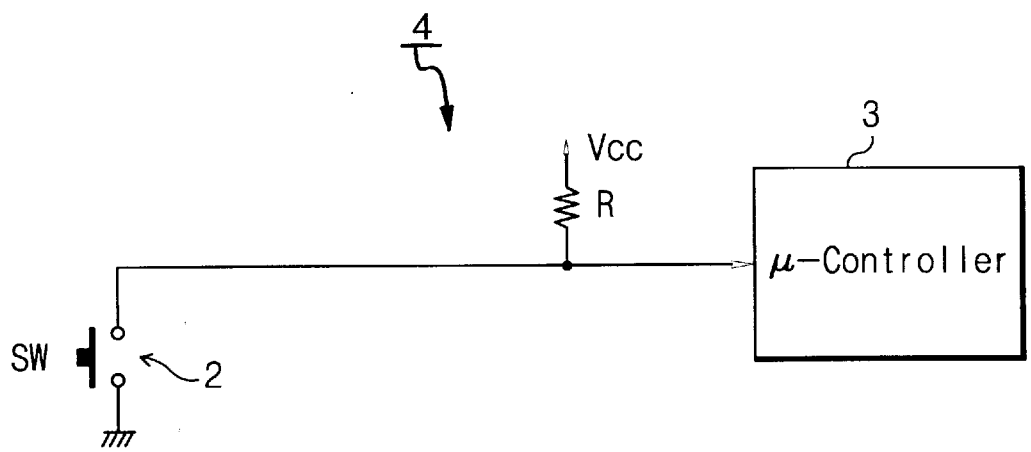
FIG. 1 is a schematic circuit diagram of a conventional power switch.

An example of a soft touch type power switch of the prior art and its circuit diagram are shown in FIG. 1. The power switch 2 is provided across the power switch signal supply line directed to a microcontroller 3. The power switch signal supply line includes a switch signal source 4 having a resistor R connected to a supply voltage Vcc. Also, the microcontroller 3 is a microprocessor having a plurality of signal input and output terminals, although one input terminal for the power switch is shown for simplification purposes, and the microcontroller 3 is designed to produce output control signals in response to one key input.

In a normal state, where the power switch 2 is not pressed, the power switch signal supply line maintains a predetermined positive voltage applied to the resistor R. This logic high level signal is inputted to the microcontroller 3 and this allows the appliance connected to the microcontroller 3 to be or remain in its current power off state. On the other hand, if the power switch 2 is pressed by the user of the device, the power switch signal supply line is dropped to ground voltage through the switch 2, and the power signal input to the microcontroller 3 becomes a logic low level signal. Then, the microcontroller 3 produces an actuating signal to power on the appliance. Once the power switch 2 is pressed again, the low level power switch signal is applied to the microcontroller 3, which toggles the output signal level to remove the actuating signal so as to power off the appliance.

Figure 2:
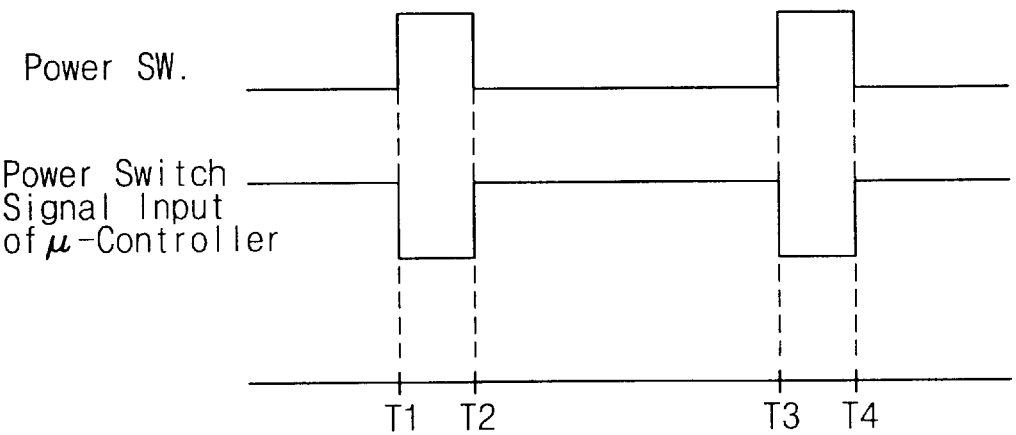
FIG. 2 is a timing diagram showing the operation of the power switch shown in FIG. 1.

The signal produced across the power switch 2 and the corresponding switch signal inputted to the microcontroller 3 are shown in the timing diagram of FIG. 2. The time durations T1–T2 and T3–T4 denote the times during which the power switch 2 is pressed.

In this arrangement, the appliance will be toggled to the power on or power off states whenever the switch 2 is pressed. Thus, an erroneous pressing of the power switch will power off the device unwillingly. If this occurs in a computer, interruption of a task as well as loss of data may occur. Further, if the device is seized by a child, the power switch is liable to be pressed frequently for fun. The frequent turning on/off of the power supply might damage the appliance.

Figure 3:
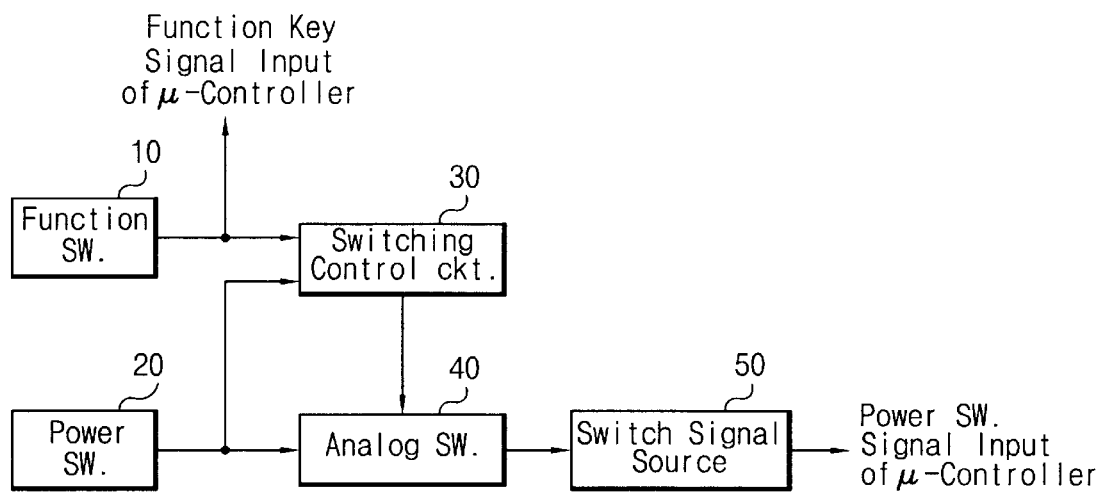
FIG. 3 is a schematic block diagram of a power switch locking device in accordance with the present invention.

Referring to FIG. 3, there is shown a block diagram of a power switch locking device in accordance with the present invention. The power switch locking device of the invention cooperates with two soft touch type switches. One is the original power switch 20 and the other is a preset function switch or key 10 among a plurality of function keys provided in an electrical appliance for controlling on/off function of the power switch 20. Also, the switches 10, 20 are formed with soft touch type switches having momentary contact points to produce logical high or low signals.

Further, the power switch locking device of FIG. 3 includes a switching control circuit 30 which receives the output signals from the power switch 20 and function switch 10 and produces an output signal having a logical signal level which is toggled whenever switches 10, 20 are pressed simultaneously and the same logical signals are inputted. Further included is an analog switch 40 provided in the power switch signal supply line between the signal output of the power switch 20 and the power switch signal input of the microcontroller (not shown). In response to the output signal level of the switching control circuit 30, the analog switch 40 turns on/off to connect the power switch 20 to, or disconnect the power 20 from, the signal supply line. Further, there is provided a switch signal source 50 connected to the output side of the analog switch 40 for generating the power switch signal that corresponds to the off state when the analog switch 40 is in the off state.

Also, the signal output of the function switch 10 is directed to the corresponding signal input of the microcontroller. As previously mentioned, the microcontroller is a conventional device that has a plurality of signal input and output terminals, and which is designed to produce output control signals in response to a key input according to a control program stored in the microcontroller.

Figure 4:
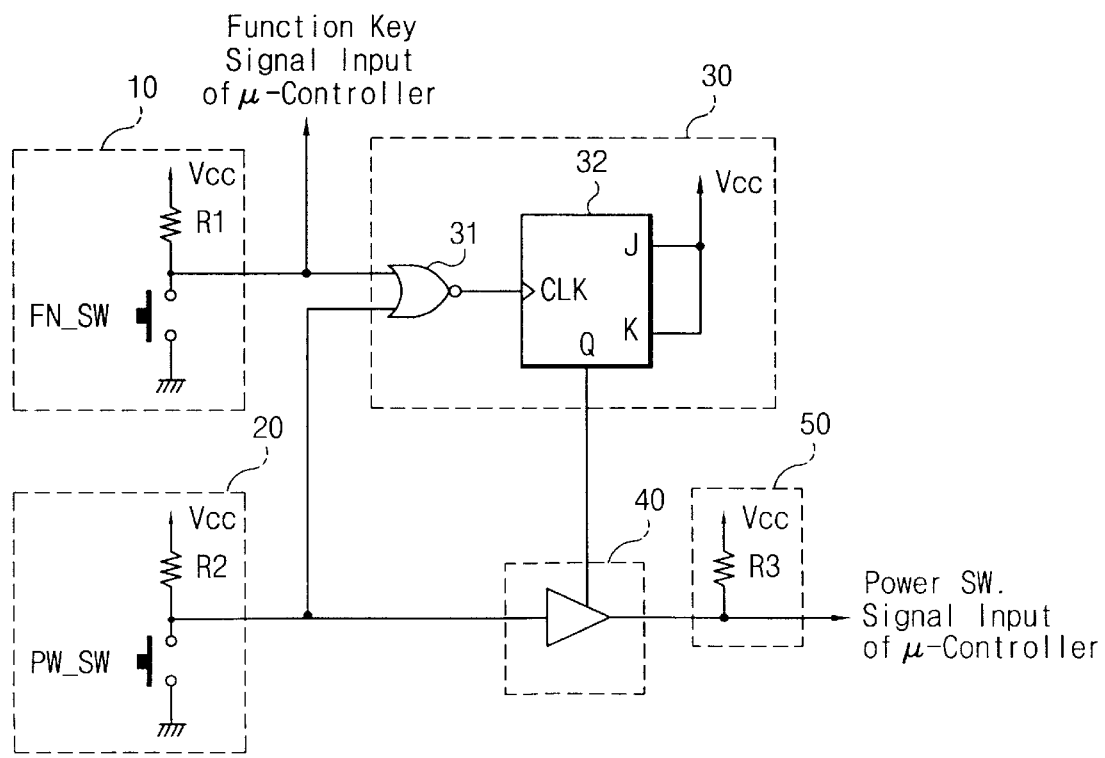
FIG. 4 is a detailed circuit diagram of the power switch locking device shown in FIG. 3.

Preferably, the switching control circuit 30 comprises a NOR gate 31 and a J-K flip-flop 32, as shown in FIG. 4, which is a detailed circuit diagram of the power switch locking device shown in FIG. 3.

As shown in FIG. 4, the function switch 10 and the power switch 20 include soft touch type switches and switch signal sources comprised of resistors R1 and R2 connected to a supply voltage Vcc, respectively. The signal outputs of the function switch 10 and power switch 20 are connected to the inputs of the NOR gate 31, and the output thereof is the clock input CLK of the J-K flip-flop 32. The J, K inputs of the flip-flop 32 are commonly connected to the supply voltage Vcc which is set to the logic high level state. Thus, this J-K flip-flop 32 forms a T flip-flop. The output Q of the J-K flip-flop 32 is connected to the gate input of the analog switch 40 located in the power switch signal supply line between the signal output of the power switch 20 and the power switch signal input of the microcontroller (not shown).

The analog switch 40 functions as a transmission gate, and comprises an FET that is available in an MC 14066 analog switch. Switch signal source 50 having a resistor R3 connected to the supply voltage Vcc is connected to the output of the analog switch 40.

Figure 5:
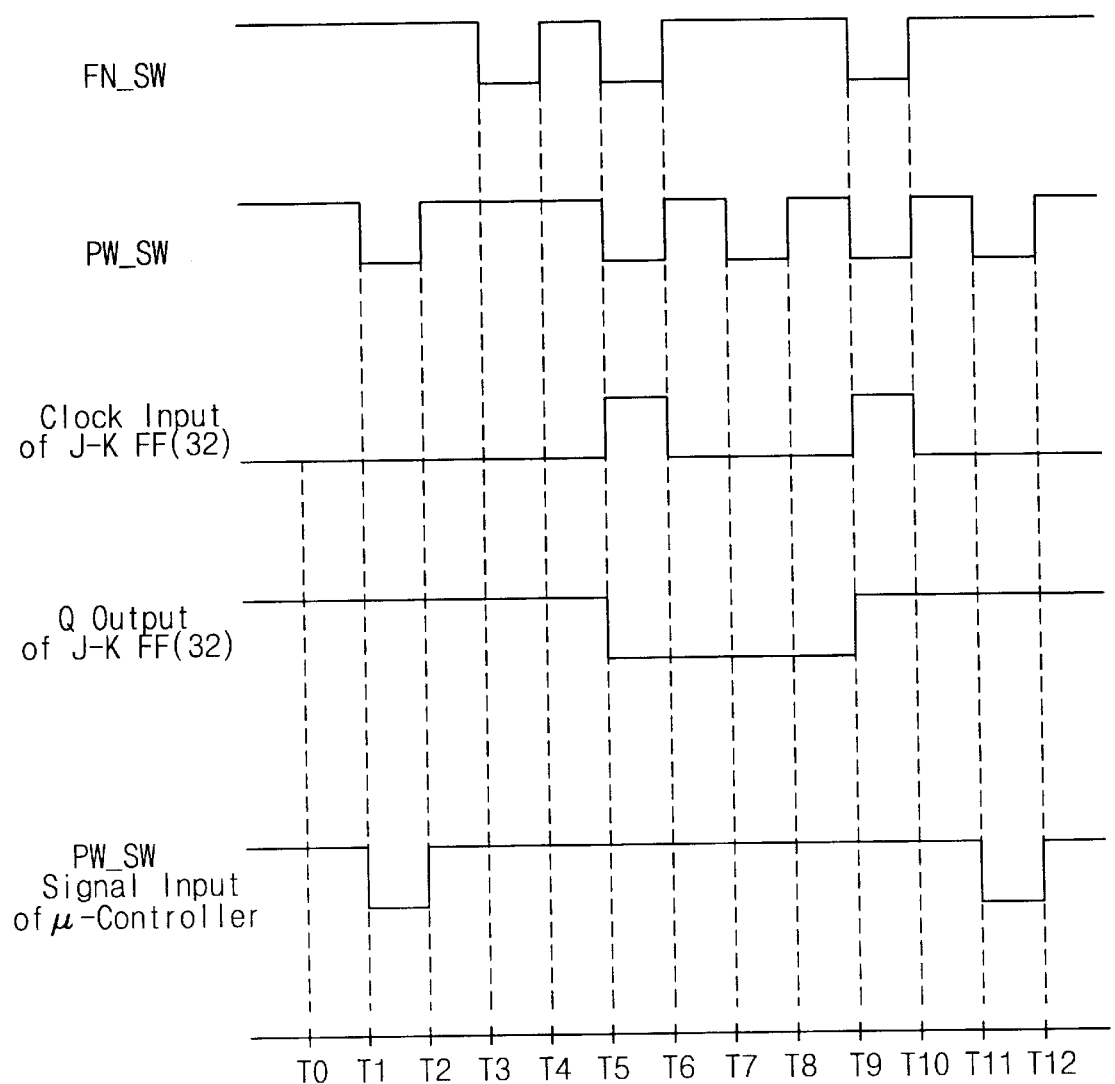
FIG. 5 is a timing diagram showing the operation of each section of the circuit shown in FIG. 4.

The operation of the above described power switch locking device will be explained with reference to the timing diagram shown in FIG. 5.

At the initial state of T0, the output signals FN_SW and PW_SW of the function switch 10 and power switch 20 are set to the logic high level, since they are in the normally open state. These high level signals are applied to the inputs of the NOR gate 31, and a logic low level signal is produced at the output of NOR gate 31. This low level signal is supplied to the clock input CLK of the J-K flip-flop 32. Since both the J, K inputs of the flip-flop 32 are set to the logic high level state, the J-K flip-flop 32 functions as a T flip-flop and the output Q of the J-K flip-flop 32 maintains a logic high level until a high level clock signal is inputted to the clock input CLK of the J-K flip-flop 32. This means that the Q output signal level is inverted by a clock input signal when the J, K inputs of the flip-flop 32 are set to the logic high level.

The high level output signal of the J-K flip-flop 32 is supplied to the gate input of the analog switch 40. This will allow the analog switch 40 to be switched on and the power switch signal supply line from power switch 20 will be connected to the power switch signal input of the microcontroller. Thus, in this state, if the user presses the power switch 20 at time T1, a low level switch signal will be transferred to the power switch signal input of the microcontroller.

Consequently, in the normal state, the microcontroller responds to the power switch signal fed from the power switch 20 and produces an output signal that actuates a main power switch or power relay so that the electrical appliance can be supplied with required electrical power.

If the power switch 20 and the function switch 10 are pressed simultaneously at time T5, the output signals FN_SW and PW_SW of the function switch and power switch fall to a logic low level since they are grounded. These low level signals are applied to the inputs of the NOR gate 31, and a logic high level signal is produced at the output of the NOR gate 31. This high level signal is applied to the clock input CLK of the J-K flip-flop 32. Since a high-level clock signal is inputted to the clock input CLK, the high-level Q output of the J-K flip-flop 32 is inverted to the logic low level, and this state is maintained until another clock signal is inputted.

The low level output signal fed from the output Q of the J-K flip-flop 32 is continuously supplied to the gate input of the analog switch 40. This will allow the analog switch 40 to be switched off and the power switch signal supply line to be disconnected from the microcontroller. Thus, if the user presses the power switch 20 at time T7, the low level power switch signal PW_SW cannot be transferred to the power switch signal input of the microcontroller. Rather, a high level signal generated by the switch signal source 50 is supplied to the input of the microcontroller. Therefore, the operation of the power switch 20 is disabled and the power switch 20 is placed into a locked state.

In this locked state, the microcontroller will not respond to the power switch signal PW-SW fed from the power switch 20, and the main power switch or power relay remains in the off state so that the electrical device cannot be supplied with electrical power.

Meanwhile, if the power switch 20 and the function switch 10 are pressed again simultaneously at time T9, the low level output signals FN_SW and PW_SW of the function switch and power switch 10 and 20 are applied to the inputs of the NOR gate 31, and a logic high level signal is produced at the output of NOR gate 31. This high level signal is applied to the clock input CLK of the J-K flip-flop 32. Thus, the low level Q output of the J-K flip-flop 32 is inverted to the logic high level, and the high level state is maintained until another clock signal is inputted.

The high-level output signal of the J-K flip-flop 32 is supplied to the gate input of the analog switch 40, and this allows the analog switch 40 to be switched on and the power switch signal supply line to be connected to the power switch signal input of the microcontroller. This means that the power switch 20 is released from the locked state and returned to the normal state. Thus, if the user presses the power switch 20 at time T11, the low level switch signal can be transferred to the power switch signal input of the microcontroller.

Also, in the normal state, the microcontroller responds to the power switch signal fed from the power switch 20, and produces an output signal that actuates the main power switch or power relay so that the electrical device can be supplied with required electrical power.

As is apparent from the foregoing, the power switch 20 is placed into a locked state when the power switch and the function switch are pressed simultaneously. During the locked state, the function of the power switch is disabled. Further, the power switch 20 returns to the normal state when the power switch 20 and the function switch 10 are pressed again simultaneously. Thus, locking/unlocking of the on/off function of the soft touch type power switch is possible by pressing the power switch and one of the specified function switches. Therefore, the power switch locking device according to the subject invention provides security means for preventing erroneous pressing of the power switch which results in sudden turning off of an electrical device, and prevents an unauthorized person from operating the power switch. In particular, the power switch locking device of the present invention provides a child resistant feature that prevents mischievous operation of the soft touch type power switch in the electrical device.

While the invention has been described in terms of an exemplary embodiment, it is contemplated that it may be practiced as outlined above with modifications within the spirit and scope of the appended claims.

What is claimed is:

1. A power switch locking device for controlling an on/off function of a power switch of an electrical appliance having a soft touch power switch and a plurality of function switches, said device comprising:

means for receiving a combinational key input of the power switch and one of the function switches; and control means connected to said receiving means and responsive to a first combinational key input of the power switch and one of the function switches for blocking the on/off function of the power switch, and responsive to a second combinational key input of the power switch and one of the function switches for unblocking the on/off function of the power switch.

2. A power switch locking device as claimed in claim 1, wherein said control means comprises a switching control circuit for producing a control output signal of a given logical level state whenever respective inputs from the power switch and one of the function switches are both of an identical predetermined level, and an analog switch responsive to the control output signal of the given logic level from the switching control circuit for selectively connecting an output signal of the power switch to, and disconnecting the output signal of the power switch from, the electrical appliance.

3. A power switch locking device as claimed in claim 2, wherein said analog switch includes a transmission gate.

4. A power switch locking device as claimed in claim 2, further comprising a switch signal source connected to an output of said analog switch for providing a power-off signal to the electrical appliance when said analog switch selectively disconnects the output signal of the power switch from the electrical appliance.

5. A power switch locking device as claimed in claim 2, wherein said switching control circuit comprises a NOR gate for receiving the respective inputs from the power switch and one of the functions switches and having an output, and a flip-flop having a clock input connected to the output of the NOR gate, said flip-flop having an output comprising the control output signal of the given logic level from the switching control means.

6. A power switch locking device as claimed in claim 5, wherein said flip-flop has a J input and a K input connected in common to a supply voltage source.

7. A power switch locking device for controlling an on/off function of a soft touch type power switch provided in an electrical appliance, wherein an output signal of the power switch is selectively provided to a power switch signal input of a microcontroller, said device comprising:

function switch means for producing an output signal of a predetermined level when said function switch means is actuated by a user;

switching control means for receiving the output signal of the power switch and said output signal from said function switch means, and for producing a control output signal which assumes a certain logical level state whenever the output signal from the power switch and the output signal from the function switch means are both of the predetermined level;

analog switch means responsive to the control output signal of the switching control means assuming the certain logical level for selectively connecting and disconnecting the output signal of the power switch and the power switch signal input of the microcontroller; and switch signal source means connected to the analog switch means for providing a power-off signal to the microcontroller when the analog switch is selectively disconnecting the output signal of the power switch and the power switch signal input of the microcontroller.

8. A power switch locking device as claimed in claim 7, wherein the switching control means includes a NOR gate and a J-K flip-flop connected thereto, wherein the output signals of the function switch means and the power switch are connected to respective inputs of said NOR gate, wherein an output of said NOR gate comprises a clock input of said J-K flip-flop, and wherein inputs of said flip-flop are commonly connected to a supply voltage so as to be set to a logic high level state.

9. A power switch locking device as claimed in claim 7, wherein the analog switch means includes a transmission gate.

10. A power switch locking device as claimed in claim 7, wherein the switch signal source means includes a resistor connected to a supply voltage.

11. A power switching locking device as claimed in claim 7, wherein said analog switch means connects the output signal of the power switch and the power switch signal input of the microcontroller when the output signal of the power switch and the power switch signal input of the microcontroller are already disconnected, and wherein said analog switch means disconnects the output signal of the power switch and the power switch input of the microcontroller when the output signal of the power switch and the power switch signal input of the microcontroller are already connected.

12. A power switch locking device for controlling an on/off function of a soft touch type power switch provided in an electrical appliance, wherein an output signal of the power switch is selectively provided to a power switch signal input of a microcontroller, said device comprising:

function switch means for producing an output signal of a predetermined level when said function switch means is actuated by a user;

switching control means for receiving the output signal of the power switch and said output signal from said function switch means, and for producing a control output signal which assumes a certain logical level state whenever the output signal from the power switch and the output signal from the function switch means are both of the predetermined level; and analog switch means responsive to the control output signal of the switching control means assuming the certain logical level for selectively connecting and disconnecting the output signal of the power switch and the power switch signal input of the microcontroller.

13. A power switching locking device as claimed in claim 12, wherein the switching control means includes a NOR gate and a J-K flip-flop connected thereto, wherein the output signals of the function switch means and the power switch are connected to respective inputs of said NOR gate, wherein an output of said NOR gate comprises a clock input of said J-K flip-flop, and wherein inputs of said flip-flop are commonly connected to a supply voltage so as to be set to a logic high level state.

14. A power switching locking device as claimed in claim 12, wherein the analog switch means includes a transmission gate.

15. A power switching locking device as claimed in claim 12, wherein said analog switch means connects the output signal of the power switch and the power switch signal input of the microcontroller when the output signal of the power switch and the power switch signal input of the microcontroller are already disconnected, and wherein said analog switch means disconnects the output signal of the power switch and the power switch input of the microcontroller when the output signal of the power switch and the power switch signal input of the microcontroller are already connected.

16. A power switching locking device as claimed in claim 12, further comprising switch signal source means connected to the analog switch means for providing a power-off signal to the microcontroller when the analog switch is selectively disconnecting the output signal of the power switch and the power switch signal input of the microcontroller, and for providing no signal to the microcontroller when the analog switch is selectively connecting the output signal of the power switch and the power switch signal input of the microcontroller.

17. A power switching locking device as claimed in claim 16, wherein the switch signal source means includes a resistor connected to a supply voltage.

\* \* \* \* \*